K. B. QUINAN.
PRODUCTION OF NITRIC ACID.
APPLICATION FILED FEB. 24, 1919.
1,355,357.
Patented Oct. 12, 1920.
3 SHEETS—SHEET 2.
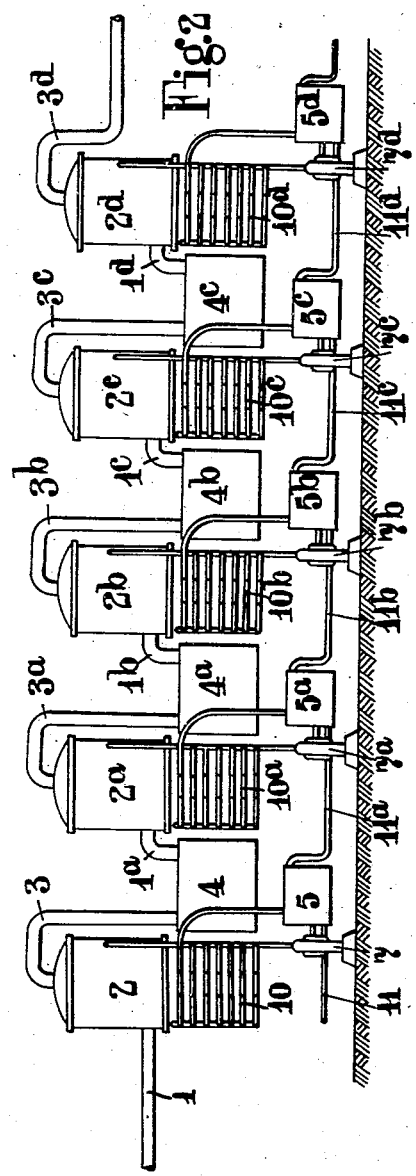
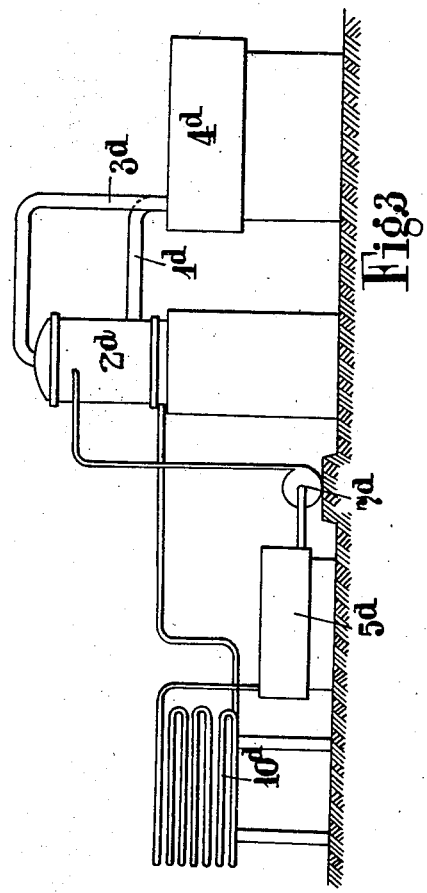
INVENTOR
Kenneth Bingham Quinan
BY
Byrnes Townsend Beierlestein
ATTORNEY

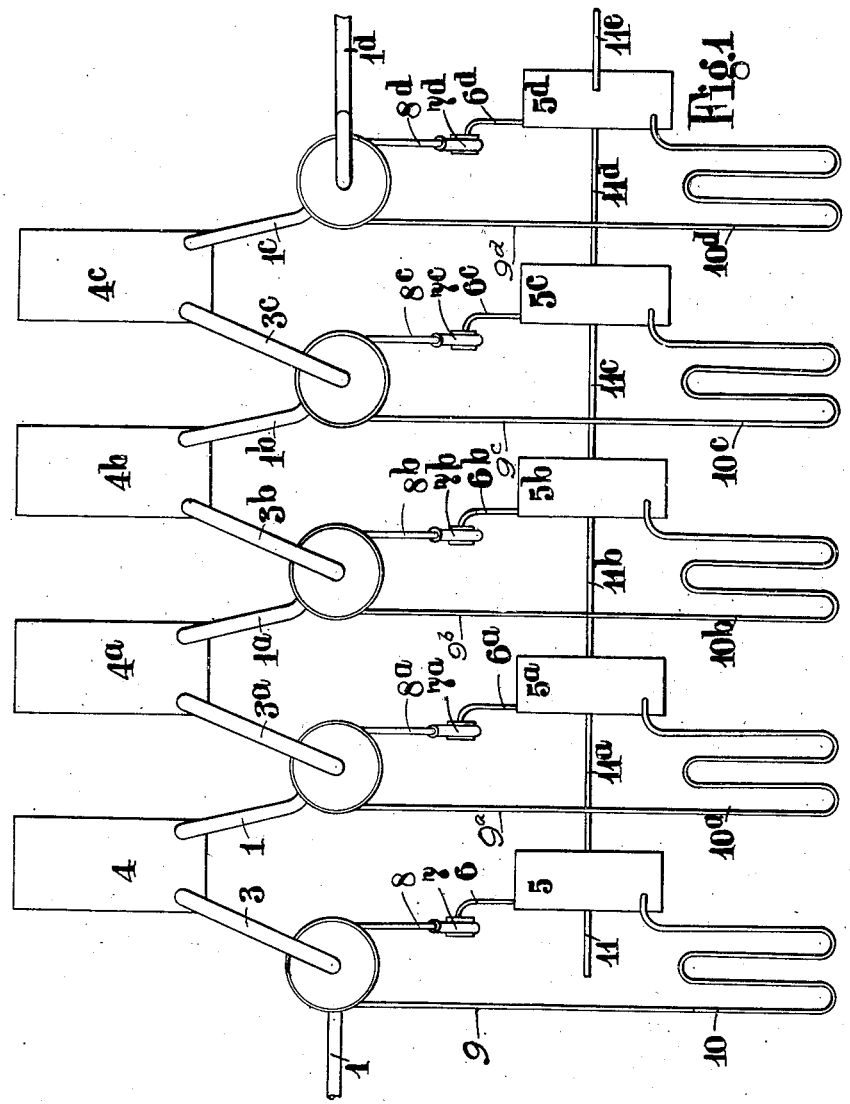

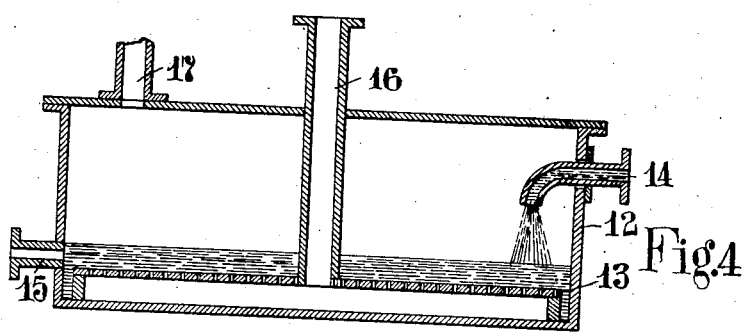
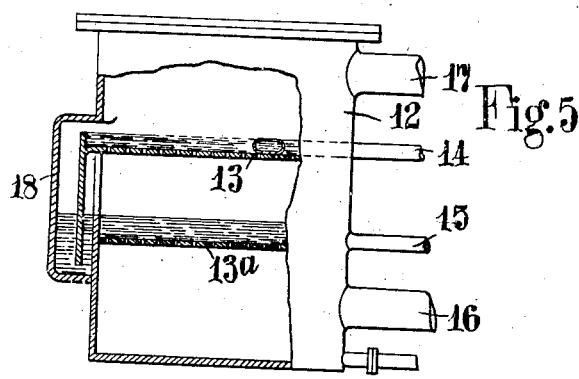
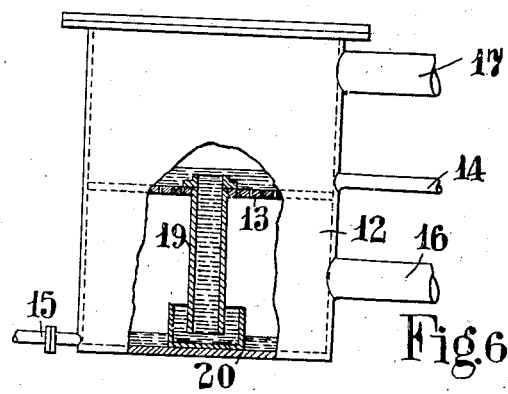

UNITED STATES PATENT OFFICE.

KENNETH BINGHAM QUINAN, OF SOMERSET WEST, CAPE PROVINCE, SOUTH AFRICA.

PRODUCTION OF NITRIC ACID.

1,355,357.  Specification of Letters Patent.  Patented Oct. 12, 1920.

Application filed February 24, 1919. Serial No. 278,896.

*To all whom it may concern:*

Be it known that I, KENNETH BINGHAM QUINAN, a citizen of the United States of America, and residing at Somerset West, Cape Province, Union of South Africa, have invented certain new and useful Improvements in and Relating to the Production of Nitric Acid, of which the following is a specification.

This invention relates to the production of nitric acid from gases containing oxids of nitrogen and is more particularly concerned with the synthetic production of nitric acid.

The processes for the synthetic production of nitric acid may be divided into two classes, the first of which involves the direct oxidation of nitrogen to nitric oxid and the second, the production and subsequent oxidation of ammonia.

In processes of both classes, nitric oxid is formed and this nitric oxid requires to be oxidized to nitrogen peroxid $NO_2$, which is then caused to react with water, producing nitric acid and nitric oxid.

A characteristic of processes of the first class is that the product of oxidation of the atmospheric nitrogen is a gaseous mixture having a low content of oxids of nitrogen, the content being equivalent to between $1\frac{1}{2}$ and $2\frac{1}{2}$ per cent. of nitric oxid, while processes of the second class yield gaseous mixtures considerably richer in oxids of nitrogen. In processes of this class roughly 1 volume of ammonia is mixed with 10 volumes of air and the mixture on oxidation will yield a product containing roughly 10 per cent. of oxids of nitrogen, expressed as NO.

In processes of both classes, the nitric oxid is required to be oxidized to nitrogen peroxid according to the equation:—

The gases containing nitrogen peroxid, in consequence of the heat evolved by the reaction, are preferably cooled to a suitable temperature prior to bringing them into contact with water in order to produce nitric acid according to the equation:—

As will be observed, only four-sixths of the amount of nitrogen peroxid is converted into nitric acid, the remaining two molecules being converted into nitric oxid which should be again converted into nitrogen peroxid and brought into contact with water to produce nitric acid and so on, the gases becoming progressively poorer in oxids of nitrogen.

The absorption of the nitrogen peroxid by the liquid absorbent, water or dilute nitric acid, as the case may be, has hitherto been effected in absorption towers or in absorption chambers arranged singly or in series or parallel or series parallel and in some or all of which refractory packing is contained. The aqueous absorbent and the gases are passed in counter-current through these towers and when the towers or chambers are arranged in series, the absorbent is pumped from the base of each tower or chamber of the series to the head of the next succeeding tower or chamber.

Both of the reactions indicated above proceed with a velocity which more or less varies directly as the concentration of oxids of nitrogen in the gases, *i. e.*, to their partial pressures and it therefore follows that the reactions take place much more rapidly in the initial than in the final towers of the series. With towers of any considerable proportions it is impossible to control the temperature conditions, in view of the strongly exothermic character of the reactions and consequently the most desirable conditions in regard to temperature cannot be realized.

The cost of the towers is moreover very considerable both in consequence of the materials employed in their construction and the character of the foundations required to support their very great weight.

The present invention consists in effecting repeated contacts between the gases containing oxids of nitrogen and the aqueous absorbent, by distributing the aqueous absorbent over the surfaces of permeable diaphragms, through which the gases are caused to pass under such conditions that substantial percolation of the absorbent through the permeable diaphragms is prevented.

As permeable diaphragms, plates provided with a large number of holes of a suitable size to enable the absorbent and the gas to be brought into intimate contact, are employed.

The diaphragms may be arranged one above the other in a suitable container, or a plurality of containers may be employed, in each of which a single diaphragm is arranged.

When necessary for the purpose of enabling a reaction to take place in the gas phase, the volume of the space through which the gases pass on their way from one contact to the second contact, is proportioned to allow time for the reaction in the gas phase to progress to a desired extent.

This space may be constituted by the space within the container above the diaphragm, the space below the succeeding diaphragm and the intervening gas connections, if any. If desirable or necessary, however, separate chambers may be arranged between successive diaphragms, so that the gases may be caused to traverse the chambers between the contact stages.

Suitable apparatus for carrying the invention into effect is illustrated by way of example in the accompanying drawings, in which:—

Figure 1 represents, in plan, a suitable arrangement of plant, and

Fig. 2 is an end elevation, and

Fig. 3 is a front elevation thereof; while

Figs. 4, 5 and 6 illustrate suitable constructions of devices employed as absorbers.

In the drawings, 1, $1^a$, $1^b$, $1^c$ and $1^d$ are the conduits for leading the gases containing oxids of nitrogen into the absorbers, 2, $2^a$, $2^b$, $2^c$ and $2^d$ respectively, while 3, $3^a$, $3^b$, $3^c$ and $3^d$ are the conduits leading the gases from the absorbers after they have passed through the liquid therein.

The devices 4, $4^a$, $4^b$ and $4^c$ are oxidation chambers which may be of any suitable construction, and which are provided for the purpose of enabling the lower oxids of nitrogen to become oxidized to nitrogen dioxid by means of the free oxygen contained in the gases due to the presence of air therein, and to the reaction between the nitrogen dioxid and the water which takes place in the absorbers.

The conduit 1 serves to bring the oxids of nitrogen from the apparatus in which they are formed by, for instance, the catalytic oxidation of ammonia, while the conduits $1^a$, $1^b$, $1^c$ and $1^d$ conduct the gases from the oxidizing chambers to the relative absorption chambers and the conduits 3, $3^a$, $3^b$, $3^c$ lead the gases from the absorption chambers to the relative oxidation chambers, while the conduit $3^d$, conveys the gases which have been substantially or entirely freed from oxids of nitrogen to the atmosphere.

Circulating tanks 5, $5^a$, $5^b$, and $5^c$ and $5^d$ are provided, and these tanks are connected respectively by pipes 6, $6^a$, $6^b$, $6^c$ and $6^d$ with pumps 7, $7^a$, $7^b$, $7^c$ and $7^d$, the delivery sides of which are connected by pipes 8, $8^a$, $8^b$, $8^c$ and $8^d$ with the absorbers 2, $2^a$, $2^b$, $2^c$ and $2^d$ respectively, in such manner that they deliver the liquid on to the surfaces of the diaphragms therein. Pipes 9, $9^a$, $9^b$, $9^c$ and $9^d$ convey the liquid from these diaphragms through coolers 10, $10^a$, $10^b$, $10^c$ and $10^d$ back to the respective tanks.

Into the tank $5^d$ water is fed at the desired rate by the pipe $11^e$, and from this tank the liquid passes when it reaches the level of the pipe $11^d$ to the next tank, the pipes $11^c$, $11^b$ and $11^a$ similarly conveying any excess of liquid from a preceding to a succeeding tank, while the acid finally leaves the system by the pipe 11.

Referring to Figs. 4, 5 and 6, which illustrate suitable devices employed as absorbers, 12 indicates the walls of the absorption chambers 13, and in the case of the construction shown in Fig. 5, $13^a$ the diaphragms therein, 14 the inlet for the liquid, 15 the outlet therefor, 16 the gas inlet and 17 the corresponding outlet.

In the construction illustrated in Fig. 4, the gas inlet 16 passes through the cover of the absorption chamber and extends downwardly to the perforated diaphragm 13 into the space below which it delivers the gases, which pass from this space through the liquid supplied to its surface by the pipe 14 and led away therefrom by the pipe 15, the gases after having passed through the liquid leaving by way of the pipe 17.

In the construction shown in Fig. 5, two diaphragms 13 and $13^a$ are provided, a trap 18 being provided in the absorber for conveying the liquid descending from the diaphragm $13^a$ on to the diaphragm 13. In this construction, as will be understood, the gas passes successively through the bodies of liquid supported on the diaphragms.

In the construction illustrated in Fig. 6, a pipe 19 with its edge extending above the surface of the diaphragm 13 is arranged to enable the liquid to flow over the edge of the pipe 19 down into the cup 20 over the edge of which the liquid will flow in turn into the base of the absorber from which it will be led away by the liquid outlet 15.

The construction of the oxidation chambers may vary within wide limits but, as the time of oxidation may be considered to vary inversely as the intimacy of mixing which can be effected in the chambers, it is generally speaking desirable to so construct these chambers as to aid in securing intimacy of mixture of the gases treated therein.

This result may be achieved, for instance, by providing means within the chambers for dividing up the gases introduced, into a number of currents as, for instance, by arranging in the chambers a plurality of perforated diaphragms or by providing therein packing of suitable form.

As will be understood, in order that substantial percolation of the liquid through the perforations in the diaphragms may be prevented, it is necessary that the difference in pressure between the gas below the diaphragms and that above shall be sufficient to cause the gas to pass upwardly through the perforations in the diaphragms and through the body of liquid supported thereon at a suitable velocity. This difference in pressure will depend upon the density and the depth of the layer of liquid on the diaphragms, and also to some extent on the size of the holes therein. The necessary conditions as regards pressure, depth of liquid and size and number of holes in the diaphragms can easily be determined by experiment or they may be calculated. It may, however, be stated that diaphragms ½ inch thick and having holes ⅛ inch in diameter, may be employed.

Having now described my invention, what I claim as new and desire to secure by Letters Patent is:—

The process of producing nitric acid from gases containing oxids of nitrogen, which consists in effecting repeated contacts between the gases containing oxids of nitrogen and the liquid absorbent, by distributing the liquid absorbent over the surfaces of permeable diaphragms through which the gases are caused to pass under such conditions as regards velocity that substantial percolation of the absorbent through the permeable diaphragms is prevented.

In testimony whereof I have signed my name to this specification.

KENNETH BINGHAM QUINAN.